United States Patent
Kreissig et al.

(10) Patent No.: US 8,745,279 B2
(45) Date of Patent: Jun. 3, 2014

(54) SELF-HEALING AND RECONFIGURATION IN AN INTEGRATED CIRCUIT

(75) Inventors: Gerald Kreissig, Herrenberg (DE); Benedikt Guekes, Stuttgart (DE); Frank Haverkamp, Tuebingen (DE); Heiko Michel, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 13/285,009

(22) Filed: Oct. 31, 2011

(65) Prior Publication Data

US 2013/0111071 A1    May 2, 2013

(51) Int. Cl.
*G06F 3/00* (2006.01)
*G06F 9/44* (2006.01)

(52) U.S. Cl.
CPC .................................. *G06F 9/4411* (2013.01)
USPC ............................................................. 710/8

(58) Field of Classification Search
None
See application file for complete search history.

(56) References Cited

U.S. PATENT DOCUMENTS

| 7,568,138 B2 | 7/2009 | Martens et al. | |
| 2004/0248353 A1* | 12/2004 | Inoue | 438/200 |
| 2008/0028266 A1* | 1/2008 | Martens et al. | 714/726 |
| 2010/0005335 A1* | 1/2010 | Ferraiolo et al. | 714/3 |

* cited by examiner

*Primary Examiner* — Henry Tsai
*Assistant Examiner* — Aurangzeb Hassan
(74) *Attorney, Agent, or Firm* — Brevetto Law Group

(57) ABSTRACT

An integrated circuit (IC) performs self-healing and reconfiguration of a portion of the IC. In response to determining that a portion of the IC should be configured, a clock to the portion of the IC to be configured is halted. That portion of the IC is then configured using a processing core that is included in the IC. The processing core is also used to perform an intended function of the IC that is different than the configuration.

17 Claims, 5 Drawing Sheets

```
301    #define PLL_BITLEN     202
302    #define PLL_WORDLEN    ((PLL_BITLEN + 31) / 32)        /* 7 uint32_t */
303    #define BYPASSN        2
304    #define SCAN_ADDR_MASK 0xFFFF0000
305    #define SCAN_ADDR 0x00008020                            /* 32-bit shifts */
306    #define UPDATE_ADDR    (0xA000 | (PLL_BITLEN % 32))
307
308    /* PLL ScanChains for different frequencies */ static uint32_t mc_plls[][PLL_WORDLEN] = {
309        { 0x00000000, 0x00000000, 0x00100000, 0x02258C00, 0x50000040,
310          0x00000000, 0x00000000 }, /* 800 MHz */
311        { 0x00000000, 0x00000000, 0x00100000, 0x05558800, 0x50000030,
312          0x00000000, 0x00000000 }, /* 1066 MHz */
313        { 0x00000000, 0x00000000, 0x00100000, 0x05558A00, 0x50000030,
314          0x00000000, 0x00000000 }, /* 1333 MHz */
315        { 0x00000000, 0x00000000, 0x00100000, 0x05558C00, 0x50000040,
316          0x00000000, 0x00000000 }, /* 1600 MHz */
317        /* ... */
318    };
319
320    void scan_LP_BNDY( int FreqSet, int pass ) {
321        uint32_t j, addr;
322        uint64_t val;
323        tp_clk_region_t reg1;
324        tp_scanselq_t reg2;
325        tp_lfir_err_mask_reg_pcb2_t firMask, firMaskPrev;
326        tp_lfir_err_reg_pcb1_t firErr;
327
328        /* Halt Clock to Portion to be reconfigured */
329        reg1.val = 0;
330        reg1.clock_cmd = 2;
331        reg1.clock_region_mem = 1;
332        reg1.sel_thold_sl = 1;
333        reg1.sel_thold_nsl = 1;
334        reg1.sel_thold_ary = 1;
335        writeScom( TP_CLK_REGION, reg1.val );
336
337        /* Select scan region and scan type */
338        reg2.val = 0;
339        reg2.scansel_clk_mem  = 1;
340        reg2.scansel_bndy_fary = 1;
341        writeScom( TP_SCANSELQ, reg2.val );
```

FIG. 3A

```
342     /* Scan new PLL setting */
343     for (j = 0; j < PLL_WORDLEN; j++) {
344         val = mc_plls[FreqSet][j]; /* construct 32-bit data word */
345         val |= (pass == 2 && j == 4) ? BYPASSN : 0;
346         val <<= 32;
347
348         addr = (TP_SCANSELQ & SCAN_ADDR_MASK); /* calculate addr */
349         addr |= (j == PLL_WORDLEN - 1) ? UPDATE_ADDR : SCAN_ADDR;
350         writeScom( addr, val );
351     }
352
353     /* Clocking 1 cycle for NSL clock */
354     reg1.val = 0;
355     reg1.clock_cmd = 3;
356     reg1.clock_region_mem = 1;
357     reg1.sel_thold_nsl = 1;
358     writeScom( TP_CLK_REGION, reg1.val );
359
360     /* Clear Errors and Events */
361     /* Clear MC_PLL_UNLOCK FIR bits during scanning process */
362     writeScom( TP_LFIR_ERR_REG_PCB1, firErr.val );
363     readScom( TP_LFIR_ERR_REG, &val );
364     firErr.val = val;
365
366     /* Clear the PLL FIR */
367     firErr.val = ~0;
368     firErr.tppll_ec_err = 0;
369     firErr.tppll_mc_err = 0;
370     writeScom( TP_LFIR_ERR_REG_PCB1, firErr.val );
371
372     writeScom( TP_SCANSELQ, 0 ); /* clear SCANSELQ register*/
373
374     /* Start clocks for clock_region_mem */
375     reg1.val = 0;
376     reg1.clock_cmd = 1;
377     reg1.clock_region_mem = 1;
378     reg1.sel_thold_sl = 1;
379     reg1.sel_thold_nsl = 1;
380     reg1.sel_thold_ary = 1;
381     writeScom( TP_CLK_REGION, reg1.val ); }
```

FIG. 3B

SELF-HEALING AND RECONFIGURATION IN AN INTEGRATED CIRCUIT

BACKGROUND

1. Technical Field

The present subject matter relates to configuration of an integrated circuit, and more specifically, to self-healing and reconfiguration of an integrated circuit without an external service processor.

2. Description of Related Art

Level Sensitive Scan Design (LSSD) methodology allows latches of an integrated circuit to be accessible via scanrings. By shifting these scanrings, the chip designers, test lab engineers, etc. are able to read the content of individual latches in the chip to determine the chip status and to change the contents of a latch to modify the chip behavior. This methodology allows the designer to diagnose the chip, reconfigure it by enabling or disabling certain functional units or perform repair actions by correcting invalid latch contents. The scanring shift operations are performed in a clock stop state, i.e. clocks in the chip have to be stopped to freeze the chip to a stable state. In the some chip designs the scanrings are grouped into scan regions, or clock regions. Each clock region has individual clock gating, which allows the processing clock for one region to be stopped, while other regions continue to be operational.

Scanring reads and writes have been performed by an out-of-band processor, or service processor, in the past, using a special debug interface like JTAG to read out a scanring, modify it, and write the modified data back to the scanring of the chip. In order to perform the scanring operations from an external processor, an access path from the debug interface up to the unit to be modified is used as well as the pervasive unit, which is responsible for servicing the debug interface and performing the scanring operations.

SUMMARY

Various embodiments of methods, computer program products, and integrated circuits performing self-healing and reconfiguration of an integrated circuits may include determining that a portion of the integrated circuit should be configured and halting a clock to the portion of the integrated circuit. The portion of the integrated circuit may then be configured using a processing core. The processing core also may perform an intended function of the integrated circuit.

BRIEF DESCRIPTION OF THE SEVERAL VIEWS OF THE DRAWINGS

The accompanying drawings, which are incorporated in and constitute part of the specification, illustrate various embodiments. Together with the general description, the drawings serve to explain the principles of the various embodiments. In the drawings:

FIGS. 3A and 3B together show a computer program listing of an embodiment for self-healing and reconfiguration of an integrated circuit.

DETAILED DESCRIPTION

In the following detailed description, numerous specific details are set forth by way of examples in order to provide a thorough understanding of various embodiments. However, it should be apparent to those skilled in the art that the embodiments of the present disclosure may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

A methodology and circuitry for utilizing the separate scanrings of clock regions to diagnose, configure or repair the data in latches within a clock region by executing a sequence of operations from another functional unit of the chip is disclosed herein. It enables the integrated circuit to perform self-diagnostics, configuration and healing with minimal additional circuitry over traditional methods and without the use of an out-of-band service processor. Reference now is made in detail to the examples illustrated in the accompanying drawings and discussed below.

Figure 1A:
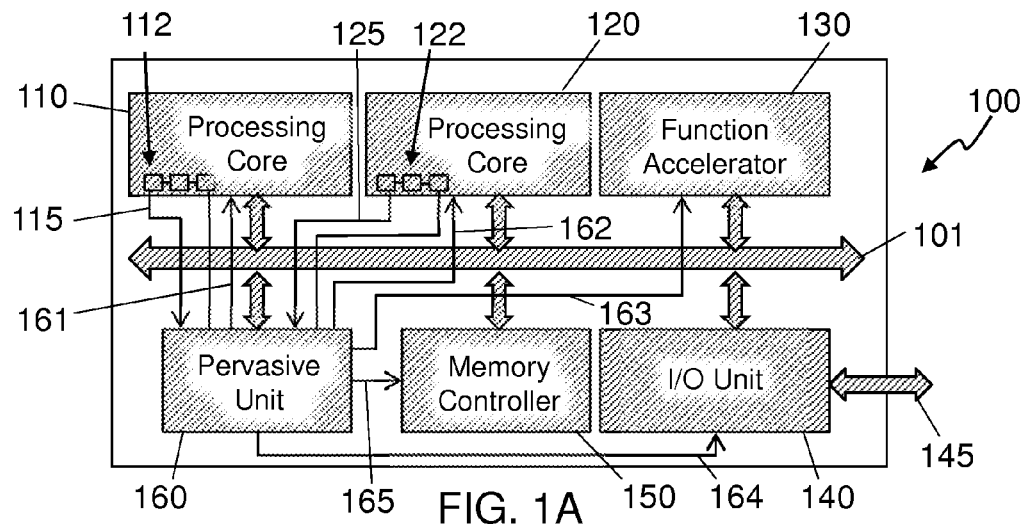
FIG. 1A is a block diagram of an embodiment of an integrated circuit capable of self-healing and reconfiguration.

FIG. 1A is a block diagram of an embodiment of an integrated circuit (IC) 100 capable of self-healing and reconfiguration. The IC may include numerous functional units, such as those shown in IC 100. The functional units may be considered portions of the IC, although a portion of the IC may refer to larger or smaller parts of the IC than a single functional unit. The functional units for various embodiments may differ but the example shown includes a first processing core 110, and a second processing core 120, a functional accelerator 130, an I/O unit 140 and a memory controller 150. Other embodiments may not include the functional units shown such as some embodiments that may not include a second processing core 120, embodiments without the function accelerator 130, embodiments without the I/O unit 140, or embodiments without the memory controller 150. An internal bus 101 may be included to allow the various functional units to communicate with each other as well as with the pervasive unit.

In some embodiments, clock control circuitry may be included in a pervasive unit 160 although other embodiments may have a separate functional unit for clock control or may include the clock control circuitry in a different functional unit. The pervasive unit 160 may provide individually controllable clocks to the separate functional units such as clock 161 to the first processing core 110, clock 162 to the second processing core 120, clock 163 to the function accelerator, clock 164 to the I/O Unit 140, and clock 165 to the memory controller 150. The pervasive unit 160 may also control one or more scanrings such as scanring 115 that includes storage elements 112 in the first processing core and scanring 125 that includes storage elements 122 in the second processing core. Other embodiments may use a different system partitioning so that the clock control circuitry and the scanring control are located in separate functional blocks. The scanrings may be accessible by the processing cores over the internal bus 101 or by some other interconnect in other embodiments.

The various functional units of the IC 100 are shown filled with light diagonal lines to show that the various units may be disabled when power is first applied before the reset is completed. The clocks 161-165 driven from the pervasive unit 160 may be disabled although in some embodiments, the clocks may be running during the reset period. Initialization of various functional blocks and/or circuits may occur with or without an active clock.

Figure 1B:
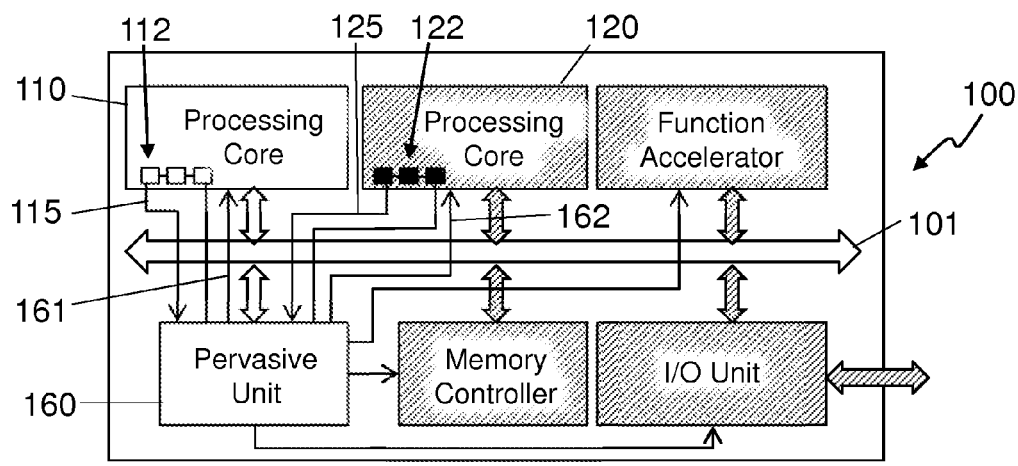
FIG. 1B is a block diagram of an embodiment of the integrated circuit performing an initial configuration.

FIG. 1B is a block diagram of an embodiment of an integrated circuit 100 performing an initial configuration after reset. The active functional units are shown unfilled and include the first processing core 110 and the pervasive unit 160. Depending on the embodiment, the other clocks may have been disabled as the IC 100 came out of reset or the first processing core may have commanded the pervasive unit to disable the other clocks. In some embodiments, other functional blocks, such as the memory controller 150, may be enabled to all other functions, such as accessing memory to load firmware into the first processing core 110. Once the firmware has been loaded into the first processing core 110, the memory controller 150 may then have its clock 153 disabled. In some embodiments, a reset may determine that a portion of the IC 100 should be configured, and any firmware loaded into the first processing core 110 may include operations to configure a portion of the IC 100. Some embodiments may load the firmware into the second processing core 120 instead of, or in addition to, the first processing core 110.

The first processing core 110 and second processing core 120 may be any type of processing unit capable of executing instructions or a computer program. The processing cores 110, 120 may include embedded memory for instructions and/or data, although in some embodiments, instructions may be stored in a separate functional unit or in an external memory accessed through the memory controller 150. The processing cores 110, 120, may also be referred to as central processing units (CPU) or as processors and may be capable of executing a single threaded computer program for self-healing and reconfiguration of the IC 100.

The first processing core 110 may include memory elements 112 that may control various functionality or initialization parameters within the first processing core 110. While the memory elements 112 may be a part of the scanring 115, the logic in the pervasive unit 160 may not be shifting data through the scanring 115 during normal operation of the first processing core 110, allowing the memory elements 112 to be used by the first processing core 110 for their regular purpose, such as software accessible storage registers, fault flags, function enable bits, or any other purpose.

While scanring 115 in the first processing core 110 and scanring 125 in the second processing core 120 are shown, other scanrings may exist in the IC 100 and may be controlled by the pervasive unit 160. In some embodiments, each functional unit or clock domain may have its own scanring. In the embodiment shown, the function accelerator 130, the I/O unit 140 and the memory controller 150 may each have a scanring but those scanrings are not shown for clarity.

Because the clock 162 has been disabled, the second processing core 120 may not be executing instructions and may not be utilizing the storage elements 122. The first processing core 110 may access the scanring 125 through the pervasive unit 160 to shift new data into the storage elements 122. Changing the contents of the of the storage elements 122 may be considered as configuring a portion of the IC 100 using a processing core, (using the first processing core 110 to configure the second processing core 120 in this example) and may change the capabilities or functionality of the second processing core 120.

Figure 1C:
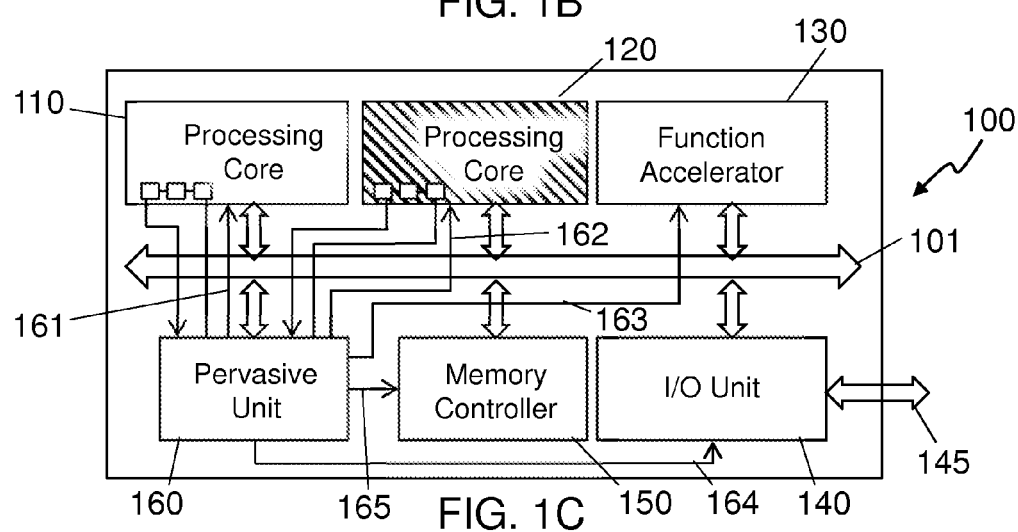
FIG. 1C is a block diagram of an embodiment of the integrated circuit operating with a modified processing core.

FIG. 1C is a block diagram of an embodiment of the integrated circuit 100 operating with a modified second processing core 120. After the firmware running on the first processing core has completed its configuration tasks, it may enable the clocks to the other functional units including the second processing core 120, the function accelerator 130, the I/O unit 140 and the memory controller 150 by sending commands to the clock control circuitry in the pervasive unit 160. The functional units 110-160 then may perform intended functions of the IC 100.

The term "intended function" as used herein and in the claims, refers to the operations performed by the IC 100 not including initialization, configuration, reconfiguration, self-diagnostics, self-healing, or other housekeeping functions of the IC 100. The intended functions of a particular IC 100 depend on the design parameters and application of the IC 100 and may vary greatly between embodiments. For example, if the IC 100 is a network controller, the intended functions of the first processing core 110 may include executing instructions to move data from a bus to memory, format data to conform to packet specifications of the target network, move data to and from the network's physical interface, manage errors that may occur in the network transmissions, and other functions associated with communicating on a computer network. But communicating with the pervasive unit to control clocks to other functional blocks and/or moving data through scanrings of other functional units may not be included in the meaning of "intended function" as used herein and in the claims.

The second processing core 120 may have been configured by the first processing core 110 in such a way that the operation of the second processing core 12 has been modified. The modification may be any type of configuration or modification that is different than the original power-up state of the second processing core 120. Changing a storage element in a portion of the IC 100 may change the functionality of that portion of the integrated circuit. In some embodiments, the modification may map out a bad section of memory, disable a hardware accelerator for a particular instruction, set enable execution of a second simultaneous thread in the second processing core 120, or any other type of modification of the operation of the second processing core 120.

Figure 1D:
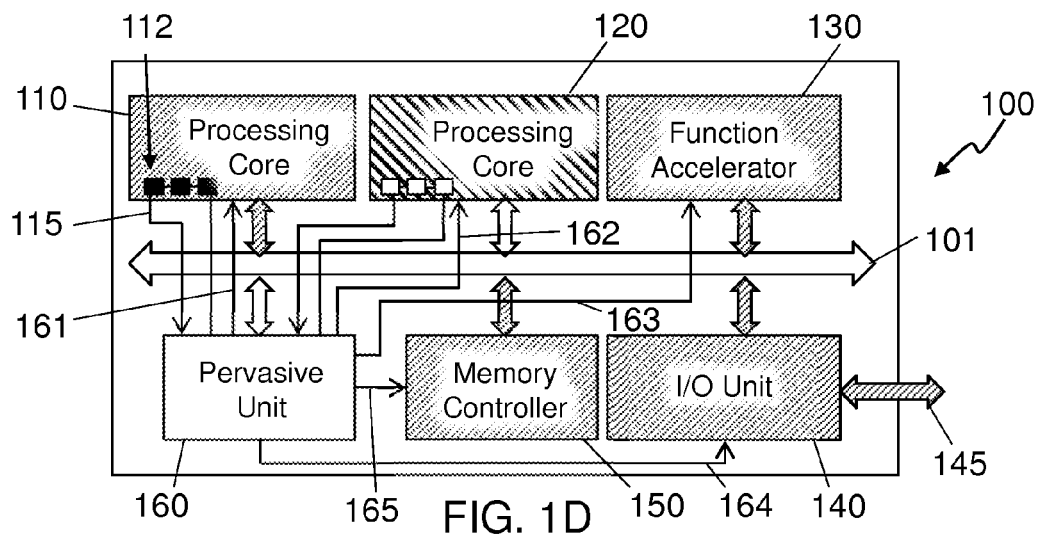
FIG. 1D is a block diagram of an embodiment of the integrated circuit performing a reconfiguration.

FIG. 1D is a block diagram of an embodiment of an integrated circuit 100 performing a reconfiguration. At various times, some embodiments may determine that a portion of the IC 100 should be configured at times other than following a reset. Some embodiments may determine that a portion of the IC 100 should be configured if a software event occurs, such as a request for a change to a configuration of the integrated circuit, a change in performance of the IC 100, a change of system application, a change of environmental conditions, a change in license model, a change of user group, a change of location, or any other software detectable event. Such a request may be performed by an operating system, a driver, an application, or any other type of software. Some embodiments may determine that a portion of the IC 100 should be configured if a hardware fault is detected in a portion of the IC 100. Examples of hardware faults that may be detected include, but are not limited to, parity errors, uncorrectable data errors, loss of sync in a phase-locked loop (PLL), inability to recover a clock from an external self-clocked interface, or any other type of hardware fault.

Once it is determined that a portion of the IC 100 should be configured if a processing core may be selected to run the reconfiguration software or firmware. In some embodiments, the first processing core 110 may be selected to reconfigure of any of the functional blocks except itself, while the second processing 120 core may be selected to reconfigure the first processing core 110. In other embodiments, the processing core may be selected by the operating system or other monitoring program based on the current contexts of the processing cores. Other embodiments may always use the first processing core 110. Any method may be used for selecting the processing core to execute the reconfiguration software/firmware. In the example shown in FIG. 1D, the second processing core 120 is selected to run the reconfiguration firmware and the firmware is loaded into the second processing core 120.

The second processing core 120 may then communicate with the clock control circuitry in the pervasive unit 160 to halt the clocks to the other functional blocks such as clock 161 to the first processing core 110, clock 163 to the function accelerator 130, clock 164 to the I/O unit 140, and clock 165 to the memory controller. The second processing core 120 may then communicate with the pervasive unit 160 to shift new data into the scanring 115 to change the storage elements 112 of the first processing core 110 to change the functionality of the first processing unit. The second processing core 120 may also shift new data into the scanring containing storage elements in the function accelerator 130 to disable the function accelerator 130. Disabling a functional unit may be done due to a change in license conditions, export regulations, or other events.

The second processing core 120 may also control the scanring of the I/O unit 140 to recalibrate the external interface 145. The recalibration process may involve multiple passes of shifting new data into the scanring, turning on the clock 164, turning off the clock 164, and shifting date out of the scanring to check for proper calibration. Various functional units may be modified by shifting new data into a scanring, depending on the embodiment and circumstances.

Figure 1E:
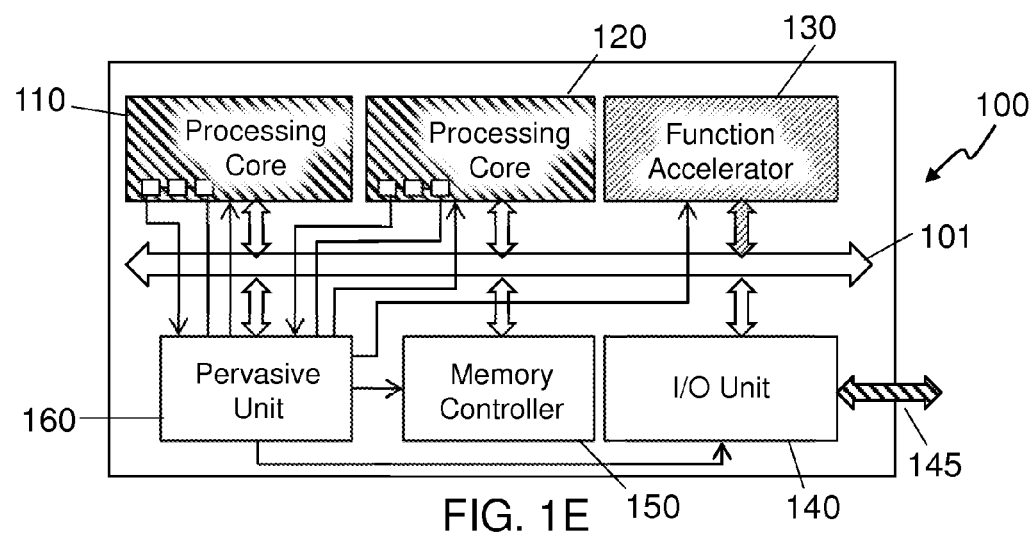
FIG. 1E is a block diagram of an embodiment of the integrated circuit operating after reconfiguration.

FIG. 1E is a block diagram of an embodiment of an integrated circuit 100 operating after reconfiguration. Once the second processing core 120 has completed reconfiguring the various functional units, the second processing core 120 my turn on the clocks 161-165 and return to performing intended functions of the IC 100. As shown by the heavy diagonal lines, the first processing core 110, and the second processing core 120 may have had their functionality modified. The function accelerator 130 may be disabled and not available for performing intended functions of the IC 100, and the external interface 145 may have been recalibrated.

Figure 2:
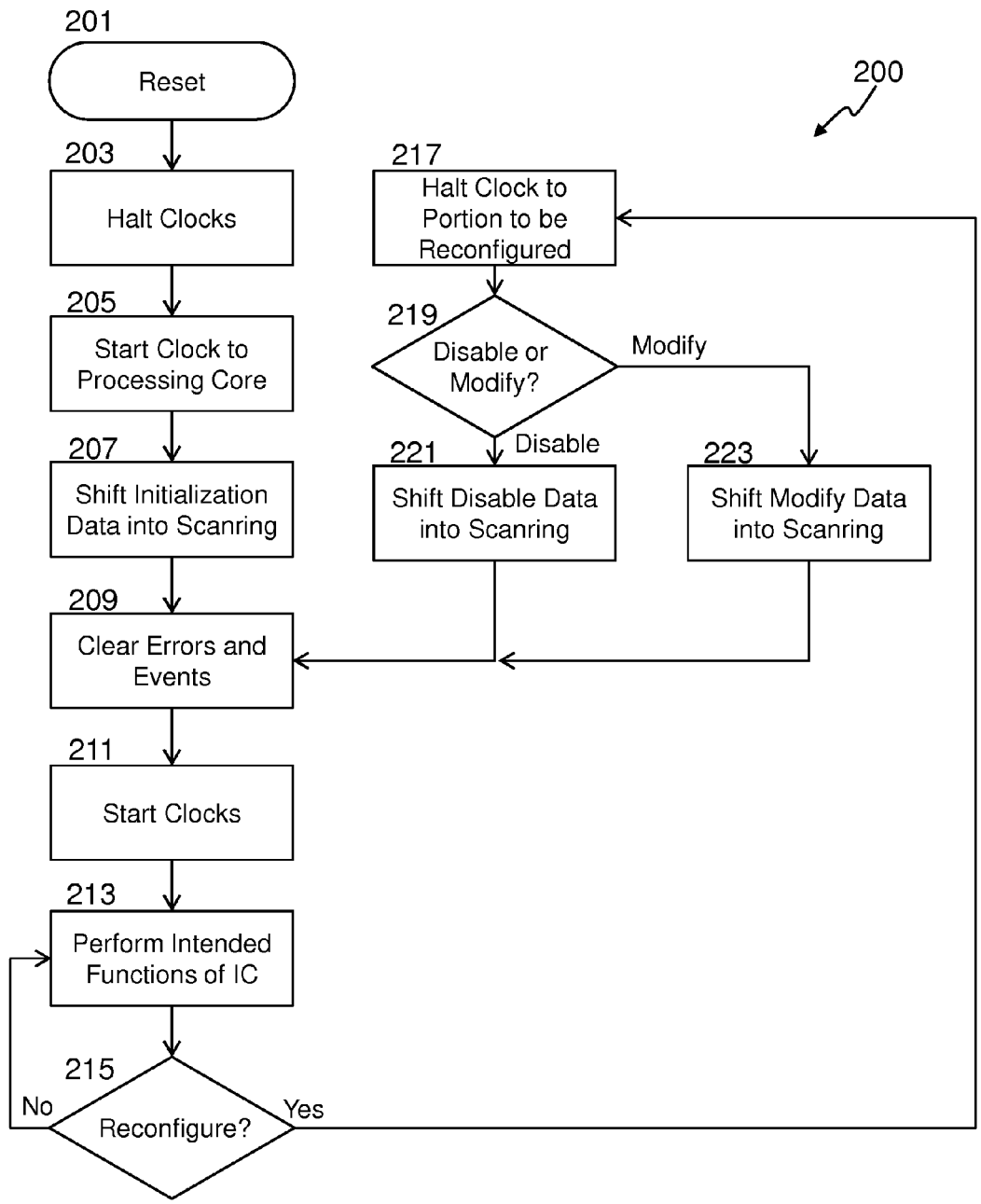
FIG. 2 is a flow chart of an embodiment of self-healing and reconfiguration in an integrated circuit.

FIG. 2 is a flow chart 200 of an embodiment of self-healing and reconfiguration in an integrated circuit (IC). A reset of the IC may occur at block 201 and the clocks to the various functional units may be halted at block 203. The clock to one processing core may be started at block 205 and software/firmware for initial configuration may be loaded into the processing core. In some embodiments, the clock to the processing core to be used is not halted by the reset, and therefore those embodiments do not need to start the clock, so block 205 is not used in those embodiments. The processing core may shift initialization data or modified initialization data into the scanring of another functional unit at block 207.

Once the new data has been shifted into the scanring, any errors and event flags may be cleared at block 209 and the clocks of the other functional units may be started again at block 211. The processing core and other functional units may then perform intended functions of the IC at block 213. The IC may then wait for a determination that the IC needs to be reconfigured at block 215.

If the IC needs to be reconfigured, which may be indicated by any of the events previously discussed, the clocks of at least the portion of the IC to be reconfigured are halted at block 217. A determination of whether the functional block will be disabled or modified may be made at block 219. If the portion of the IC is to be disabled, appropriate data to disable the portion is shifted into the scanring at block 221. If the portion of the IC is to be modified, appropriate data to make the modification is shifted into the scanring at block 223. In some embodiments, the data shifted into the scanring of the portion of the IC to be modified determines whether the portion is modified or disabled, so not separate determination of the type of modification to be performed, as in block 219, is needed. In some embodiments, additional configuration other than modifying the data of the scanring may also be done to modify and/or disable the portion of the IC. Once the data has been shifted into the scanring, any errors and event flags may be cleared at block 209 and the clocks may be started again at block 211. The processing core and other functional units may then perform intended functions of the IC at block 213.

FIGS. 3A and 3B are a computer program listing 300A/B of an embodiment for self-healing and reconfiguration of an integrated circuit. The details of the program are specific to a particular embodiment but the general functionality and flow of the program is instructional for understanding the actions being performed. The code fragment 301-381 for the scan-_LP_BNDY procedure may run on either the first processing core 110 or the second processing core 120 of the IC 100 and performs the scanning of a PLL scanring in the memory controller 150 based on the specified frequency selector to initialize and/or modify the functionality of the PLL. In this embodiment, the PLL could not be reconfigured with its clocks running so the techniques described herein are used to reconfigure the PLL.

Some error reporting registers special for the memory controller 150 may have been set up prior to execution of the program 300A/B. Lines 301-306 set up various constants for use in the program. Scanring data sets for different clock frequencies are initialized in lines 308-318. Line 320 is the entrance point for the code fragment and lines 321-326 instantiate various variables for the program. Lines 328-335 disable the clocks to at least the portion of the IC to be modified and may correspond to blocks 203 or 217 of flowchart 200 in FIG. 2.

Blocks 207, 221 and/or 223 of flowchart 200 may be performed by lines 337-358. The scanring address is calculated and written to the TP_SCAN_SELQ register at line 341. After that is done, the data is written to data registers to shift in the proper scanring contents using the loop of lines 342-351. The number of passes through the loop may be determined by the length of the particular scanring being modified. In the particular embodiment, the last bits of the scanring data are written to a different address to manage the scanring properly. One cycle of the PLL clock is then created in lines 353-358 to move the data that was shifted into the scanring into the operational sections of the latches.

Lines 360-372 clear errors and events and other status registers and may correspond to block 209 of the flowchart 200. The clocks for the memory controller 150 are then started again in lines 374-381 which may correspond to block 211 of the flowchart 200. Once the program 300A/B has finished, the processing core that was executing the program 300A/B may continue on to perform intended tasks of the IC 100 as shown in block 213 of flowchart 213 until another event is detected as shown in block 215 of flowchart 200, to cause another reconfiguration to occur.

As will be appreciated by those of ordinary skill in the art, aspects of the various embodiments may be embodied as a system, method or computer program product. Accordingly, aspects of various embodiments may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more computer readable medium(s) may be utilized. The computer readable medium is typically a computer readable storage medium. A computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. As used herein, the term "coupled" includes direct and indirect connections. Moreover, where first and second devices are coupled, intervening devices including active devices may be located there between. The term "plurality", as used herein and in the claims, means two or more of a named element; it should not, however, be interpreted to necessarily refer to every instance of the named element in the entire device. Particularly, if there is a reference to "each" element of a "plurality" of elements, there may be additional elements in the entire device that may not be included in the "plurality" and are not, therefore, referred to by "each."

The corresponding structures, materials, acts, and equivalents of all means or step plus function elements in the claims below are intended to include any structure, material, or act for performing the function in combination with other claimed elements as specifically claimed. The description of the various embodiments has been presented for purposes of illustration and description, but is not intended to be exhaustive or to limit embodiments to the forms disclosed. Many modifications and variations will be apparent to those of ordinary skill in the art without departing from the scope and gist of the disclosure. The various embodiments included herein were chosen and described in order to best explain the principles of embodiments and the practical application, and to enable others of ordinary skill in the art to understand various embodiments with various modifications as are suited to the particular use contemplated.

What is claimed is:

1. A method for configuring an integrated circuit, the method comprising:
    determining that a portion of the integrated circuit comprising an external physical link should be configured;
    halting a clock to the portion of the integrated circuit;
    configuring the portion of the integrated circuit using a processing core;
    calibrating the external physical link interface of the integrated circuit as part of the configuring, wherein the calibrating of the external physical link interface of the integrated circuit comprises,
        shifting calibration control data into a scanring after halting the clock to the portion of the integrated circuit,
        starting the clock to the portion of the integrated circuit,
        halting the clock to the portion of the integrated circuit again,
        shifting calibration control data out of the scanring, and
        checking for proper calibration of the external physical link interface by examining the calibration control data shifted out of the scanring; and
    performing an intended function of the integrated circuit using the processing core, the intended function comprising formatting data to conform to packet specifications for the external physical link interface, and sending the formatted data through the external physical link interface; wherein the intended function is different than the configuring.

2. The method of claim 1, wherein the determining that the portion of the integrated circuit should be configured comprises:
    a reset of the integrated circuit.

3. The method of claim 1, wherein the determining that the portion of the integrated circuit should be configured comprises:
    a software event.

4. The method of claim 3, wherein the software event comprises:
    a request for a change to a configuration of the integrated circuit.

5. The method of claim 3, wherein the software event is software detection of an event chosen from the group consisting of a change in performance of the integrated circuit, a change of system application, a change of environmental conditions, a change in license model, a change of user group, and a change of location.

6. The method of claim 1, wherein the determining that the portion of the integrated circuit should be configured comprises:
    detecting a hardware fault in the portion of the integrated circuit.

7. The method of claim 1, wherein the configuring of the portion of the integrated circuit using the processing core comprises:
    changing functionality of the portion of the integrated circuit by changing a state of at least one storage element in the portion of the integrated circuit using a scanring; and
    restarting the clock to the portion of the integrated circuit.

8. The method of claim 1, wherein the configuring of the portion of the integrated circuit using the processing core comprises:
    disabling the portion of the integrated circuit.

9. The method of claim 1, wherein the performing of the intended function of the integrated circuit using the processor core comprises:
    executing instructions of an operating system.

10. The method of claim 1, wherein the processor core is a first processor core, the method further comprising:
    determining that the first processor core should be configured;
    using a second processor core to halt a clock to the first processor core; and
    configuring the first processor core using the second processor core.

11. The method of claim 10, wherein the configuring of the first processing core comprises:
    changing a state of at least one storage element in the first processing core using a scanring; and
    restarting the clock to the first processing core.

12. A computer program product for configuring an integrated circuit, the computer program product comprising:
    a non-transitory computer readable storage medium having computer readable program code embodied therewith, the computer readable program code comprising:
    computer readable program code to determine that a portion of the integrated circuit comprising an external physical link should be configured;
    computer readable program code to halt a clock to the portion of the integrated circuit;
    computer readable program code to configure the portion of the integrated circuit;
    computer readable program code to calibrate the external physical link interface of the integrated circuit as part of the configuring, wherein said computer readable program code to calibrate the external physical link interface of the integrated circuit comprises,
        computer readable program code to shift calibration control data into a scanring after halting the clock to the portion of the integrated circuit,
        computer readable program code to start the clock to the portion of the integrated circuit,
        computer readable program code to halt the clock to the portion of the integrated circuit again,
        computer readable program code to shift calibration control data out of the scanting, and
    computer readable program code to check for proper calibration of the external physical link interface by examining the calibration control data shifted out of the scanting; and
    computer readable program code to perform an intended function of the integrated circuit that is different than the computer readable program code to configure the portion of the integrated circuit, the intended function comprising formatting data to conform to packet specifications for the external physical link interface, and sending the formatted data through the external physical link interface.

13. The computer program product of claim 12, further comprising:
    computer readable program code to respond to an event selected from a group consisting of a reset of the integrated circuit, a software event, and a hardware fault by invoking the computer readable program code to determine that the portion of the integrated circuit should be configured.

14. The computer program product of claim 12, wherein the computer readable program code to configure the portion of the integrated circuit comprises:
   computer readable program code to change a state of at least one storage element in the portion of the integrated circuit using a scanring to change functionality of the portion of the integrated circuit; and
   computer readable program code to restart the clock to the portion of the integrated circuit.

15. An integrated circuit comprising:
   clock control circuitry;
   a processing core to perform an intended function and a configure function of the integrated circuit and coupled to the clock control circuitry;
   a portion of the integrated circuit comprising a storage element and an external physical link interface: and
   a scanring comprising at least the storage element, the scanring accessible by the processing core;
   wherein the processing core, as at least a part of the configure function and the intended function, is capable to command the clock control circuitry to stop a clock to the portion of the integrated circuit and to change a state of the storage element using the scanring to change functionality of the portion of the integrated circuit, is capable to format data to conform to packet specifications for the external physical link interface, is capable to send the formatted data through the external physical link interface, is capable to shift calibration control data into the scanring while the clock to the portion of the integrated circuit is stopped, is capable to command the clock control circuitry to start the clock to the portion of the integrated circuit, is capable to command the clock control circuitry to stop the clock to the portion of the integrated circuit again, is capable to shift calibration control data out of the scanring while the clock to the portion of the integrated circuit is stopped, and is capable to examine the calibration control data shifted out of the scanring to check for proper calibration of the external physical link interface; and
   wherein the intended function is different than the configure function.

16. The integrated circuit of claim 15, further comprising:
   a bus to couple the first processing unit to the clock control circuitry and the scanring.

17. The integrated circuit of claim 15, wherein
   the storage element is a first storage element;
   the processing core is a first processing core comprising a second storage element, wherein the intended function is a first intended function and the configure function is a first configure function;
   the scanring is a first scanring; and
   the integrated circuit further comprising:
      a second processing core to perform a second intended function and a second configure function of the integrated circuit, and coupled to the clock control circuitry; and
      a second scanring comprising at least the second storage element, the second scanring accessible by the second processing core;
   wherein the second processing core, as at least a part of the other configure function, is capable to command the clock control circuitry to stop a clock to the first processing core and to change functionality of the first processing core by changing a state of the second storage element using the second scanring; and
   wherein the second intended function is different than the second configure function.

\* \* \* \* \*